US007155489B1

(12) United States Patent
Heilbron et al.

(10) Patent No.: US 7,155,489 B1
(45) Date of Patent: Dec. 26, 2006

(54) ACQUIRING WEB PAGE INFORMATION WITHOUT COMMITMENT TO DOWNLOADING THE WEB PAGE

(75) Inventors: Lisa Heilbron, Bellevue, WA (US); John C. Platt, Bellevue, WA (US); Bernhard Schoelkopf, Cambridge (GB); Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 09/609,001

(22) Filed: Jun. 28, 2000

(51) Int. Cl.
G06F 15/16 (2006.01)
G06F 7/00 (2006.01)
G06F 15/00 (2006.01)

(52) U.S. Cl. .............................. 709/217; 707/3; 707/6; 715/501.1; 709/218; 709/219

(58) Field of Classification Search ................ 709/217, 709/218, 219; 707/10; 715/501.1
See application file for complete search history.

(56) References Cited

U.S. PATENT DOCUMENTS

| | | | | |
|---|---|---|---|---|
| 5,572,643 A * | 11/1996 | Judson | ........................ | 709/218 |
| 5,774,660 A * | 6/1998 | Brendel et al. | ............. | 709/201 |
| 5,802,292 A * | 9/1998 | Mogul | ........................ | 709/203 |
| 5,870,769 A * | 2/1999 | Freund | ..................... | 715/501.1 |
| 6,002,400 A * | 12/1999 | Loring et al. | ................ | 345/794 |
| 6,009,429 A * | 12/1999 | Greer et al. | .................... | 707/10 |
| 6,052,486 A * | 4/2000 | Knowlton et al. | ........... | 382/232 |
| 6,057,842 A * | 5/2000 | Knowlton et al. | ........... | 345/788 |
| 6,067,565 A * | 5/2000 | Horvitz | ........................ | 709/218 |
| 6,085,226 A * | 7/2000 | Horvitz | ........................ | 709/203 |
| 6,144,962 A * | 11/2000 | Weinberg et al. | ............. | 707/10 |
| 6,151,603 A * | 11/2000 | Wolfe | ........................... | 707/10 |
| 6,182,122 B1* | 1/2001 | Berstis | ........................ | 709/217 |
| 6,182,133 B1* | 1/2001 | Horvitz | ........................ | 709/223 |
| 6,243,091 B1* | 6/2001 | Berstis | ........................ | 715/839 |
| 6,356,908 B1* | 3/2002 | Brown et al. | .................. | 707/10 |
| 6,405,192 B1* | 6/2002 | Brown et al. | ................... | 707/3 |
| 6,452,609 B1* | 9/2002 | Katinsky et al. | ............. | 345/716 |
| 6,459,364 B1* | 10/2002 | Gupta | ....................... | 340/407.1 |
| 6,523,022 B1* | 2/2003 | Hobbs | ........................... | 707/3 |
| 6,557,015 B1* | 4/2003 | Bates et al. | ............... | 715/501.1 |
| 6,584,501 B1* | 6/2003 | Cartsonis et al. | ........... | 709/224 |
| 6,585,776 B1* | 7/2003 | Bates et al. | ............... | 715/501.1 |
| 6,611,835 B1* | 8/2003 | Huang et al. | .................. | 707/10 |
| 6,647,534 B1* | 11/2003 | Graham | ....................... | 715/526 |
| 6,763,496 B1* | 7/2004 | Hennings et al. | ......... | 715/501.1 |
| 6,782,423 B1* | 8/2004 | Nakayama et al. | ......... | 709/224 |
| 6,834,372 B1* | 12/2004 | Becker et al. | ............ | 715/501.1 |

* cited by examiner

*Primary Examiner*—Jason Cardone
*Assistant Examiner*—Thomas Duong
(74) *Attorney, Agent, or Firm*—Workman Nydegger

(57) ABSTRACT

What is disclosed is acquiring information regarding a web page, without having to commit to downloading that page. In one embodiment, after a current web page is downloaded from one source, and information regarding web pages linked to by links in the current web page are downloaded from a second source, when a user hovers a cursor over a link on a current web page, an informational region is displayed by the link that includes the information from the second source. The informational region may include, for example, a text box that apparently floats by the link. The information in the region can include, for example, keywords in the meta tags of the web page; paragraph headings of the web page; links on the web page to other pages; etc.

25 Claims, 16 Drawing Sheets

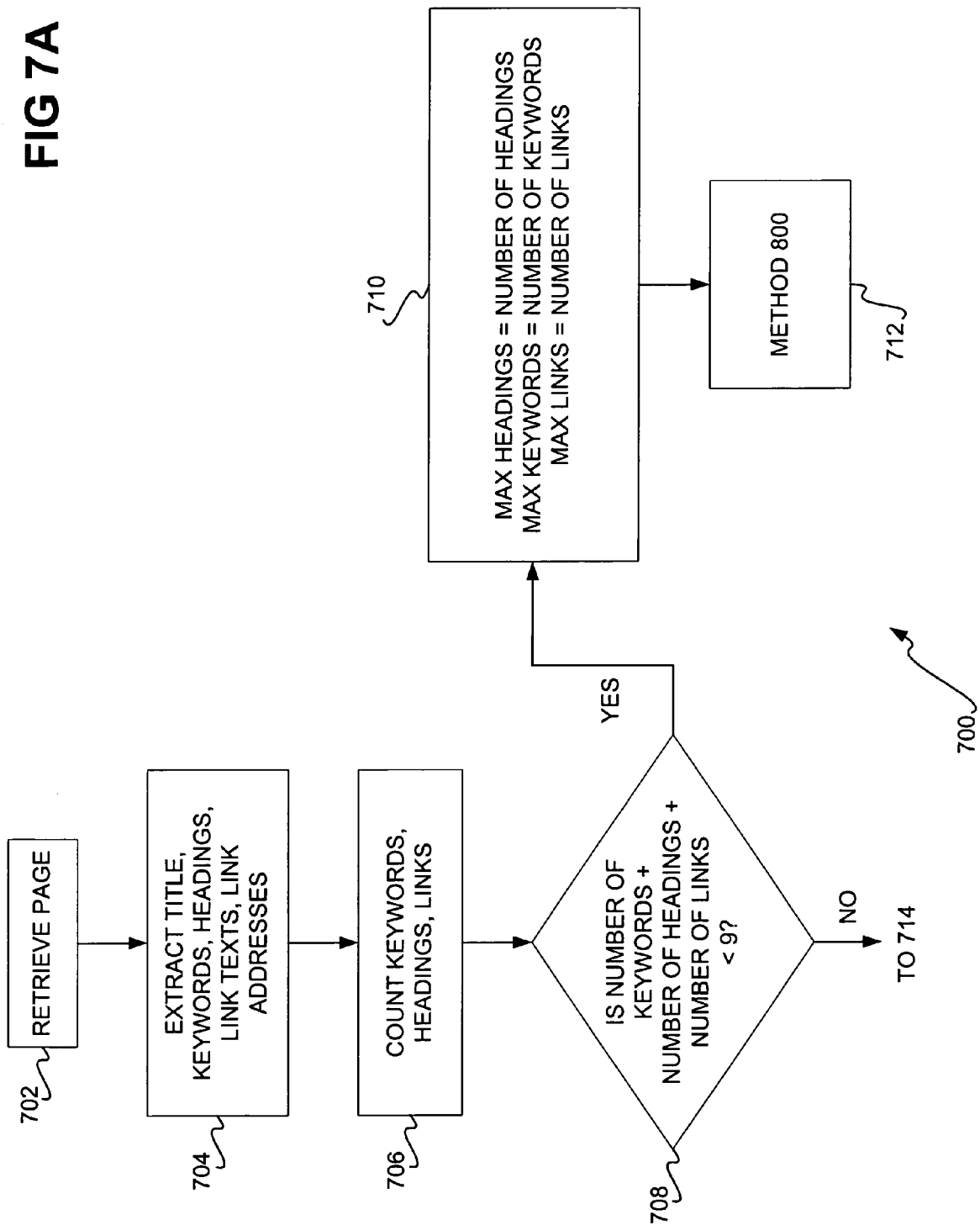

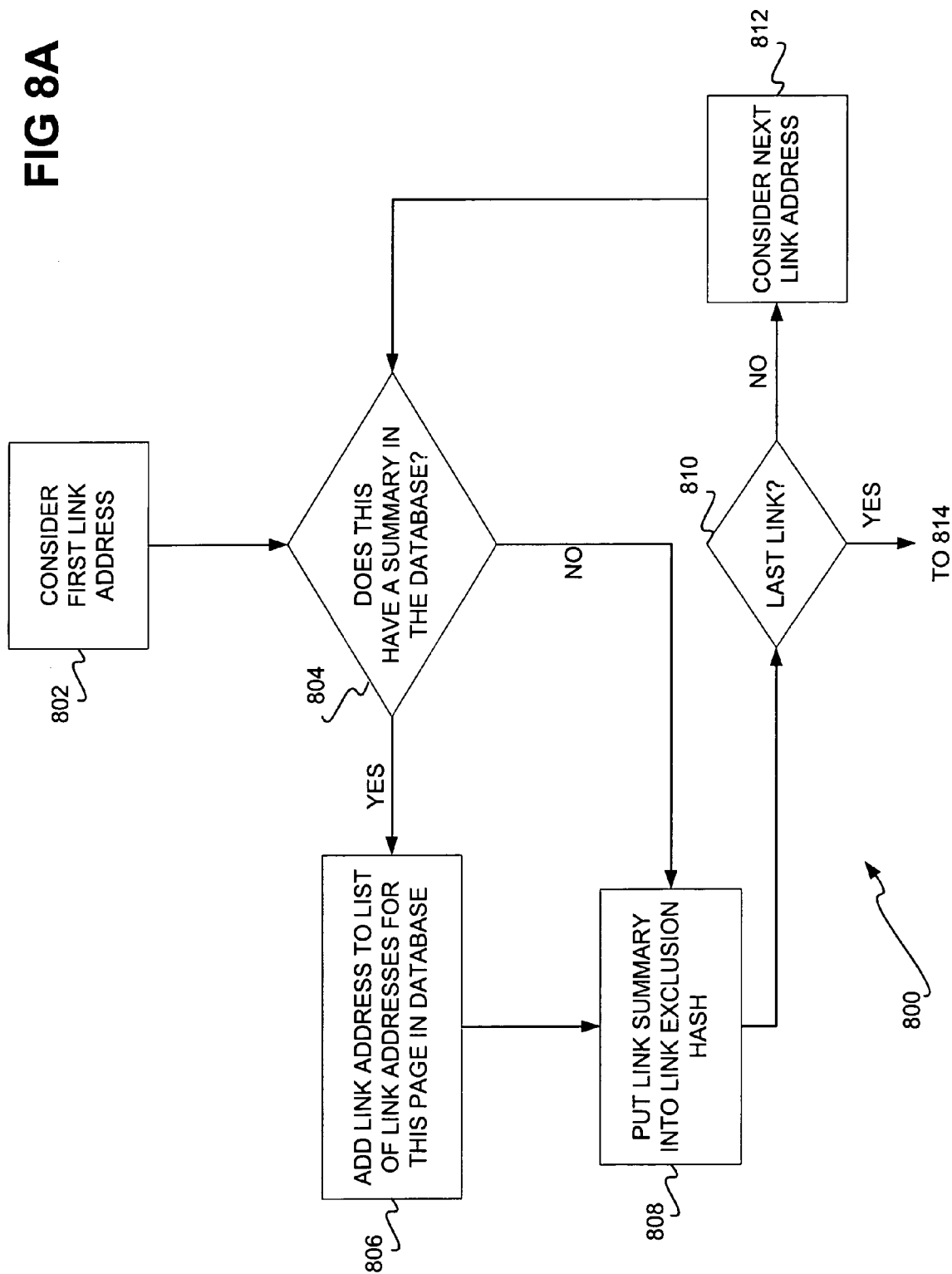

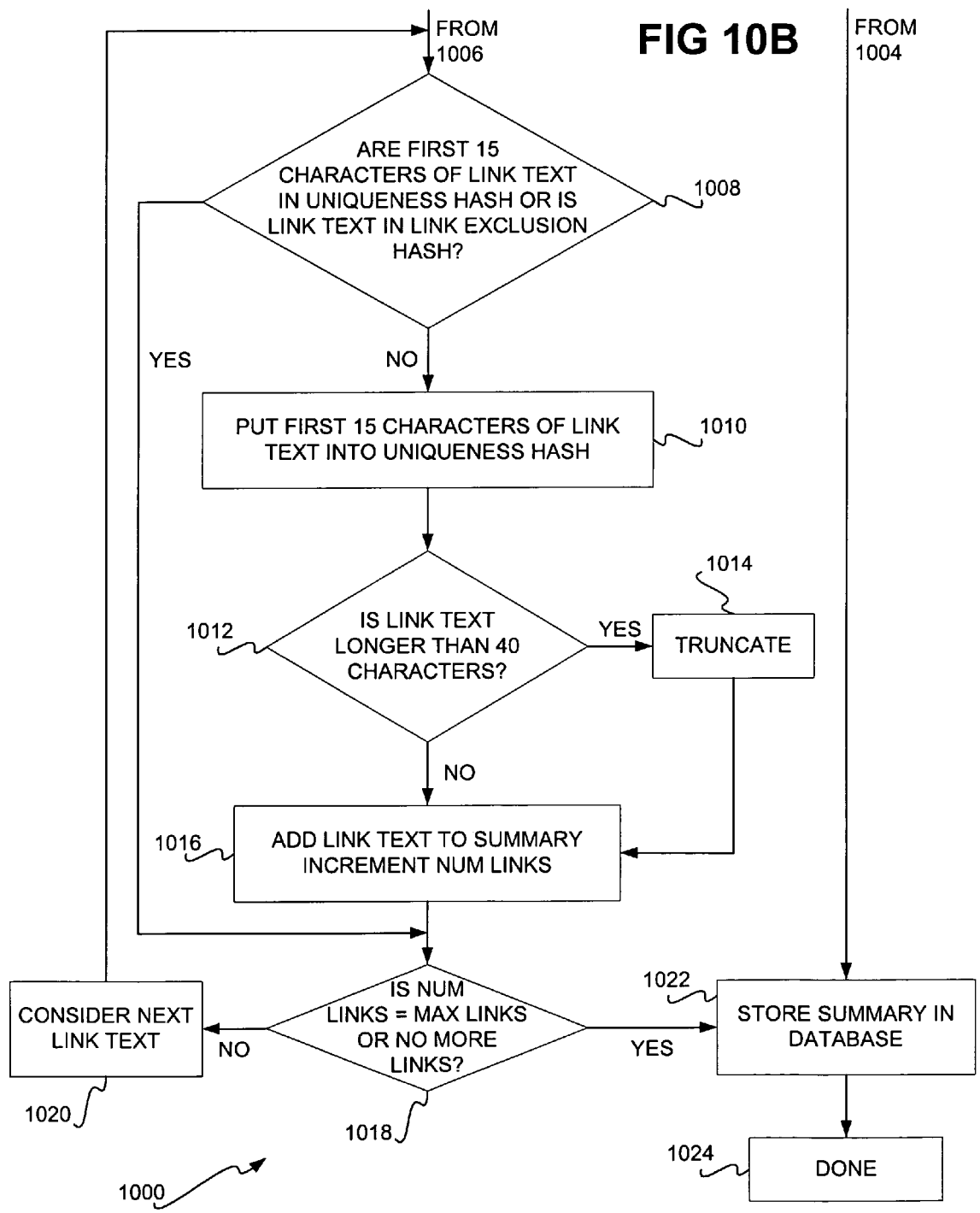

ACQUIRING WEB PAGE INFORMATION WITHOUT COMMITMENT TO DOWNLOADING THE WEB PAGE

FIELD OF THE INVENTION

This invention relates generally to web browsing, such as on the Internet, and more particularly to obtaining information regarding a web page without having to commit to downloading that page.

BACKGROUND OF THE INVENTION

The Internet has proven to be very popular with computer users. One of the more popular applications is browsing the World-Wide Web (WWW), also known as web browsing. The web is, generally, a decentralized collection of files, referred to as web pages, which are typically in a type of format known as a mark-up language, such as the HyperText Mark-Up Language (HTML). Each web page has a location that is identified by an address, in particular, a Universal Resource Locator (URL) address. A collection of web pages that is typically stored at a given physical location is referred to generally as a web site, where all of the pages of the web site have a common denominator in their addresses.

A given web page typically links to one or more other web pages, via one or more web page links contained within the page itself. A web page link, also known as a hyperlink, is such that when it is clicked on or otherwise selected, the web page to which it points is retrieved and displayed on the user's screen. Thus, browsing the web refers to viewing web pages, where a user is directed to another web page when clicking on a link, such that the user views different web pages in a given browsing session by clicking on the links to those web pages, or otherwise references the pages by their addresses.

Many users, especially home users, browse the web using a relatively slow mechanism to achieve an Internet connection, such as a modem. As an example, a modem may only have a bandwidth of 28,800–56,000 bits per second (bps), while a faster mechanism to achieve an Internet connection, such as a cable modem, a Digital Subscriber Loop (DSL) modem, or a T1 connection, may have a bandwidth ranging anywhere from 256,000–1,500,000 bps. This is because many users are located in areas that are not serviced by these higher bandwidth Internet connection mechanisms, or the cost to have such mechanisms is prohibitively high.

Such users, when encountering a web page having a number of hyperlinks to other potentially useful web pages, thus face a conundrum. Within the prior art, typically the only way such users can determine what content a given web page holds, and/or whether a given web page will be of interest, is to select the web link and be directed to the web page to which the link points. The user's web browser then retrieves the content from this new web page (referred to herein also as "downloading"), and displays it on the screen. However, a slow connection to the Internet makes for the web browsing experience to be very slow: the user typically has to wait for a significant fraction of the content of a page to load and be displayed in order to determine what that content is. If the content is not to the user's liking, he or she must then go back to the previous web page, and select another link, only to have to wait again until the web page to which this new link points is loaded and displayed on the user's computer. For many users, web browsing can be frustrating, because a user can only determine what the content of a particular page is by committing to downloading that page.

For these and other reasons, there is a need for the present invention.

SUMMARY OF THE INVENTION

Embodiments of the invention relate to acquiring information regarding a web page, without having to commit to begin downloading that page. In one embodiment, when a user hovers a cursor over a link on a current web page, an informational region is displayed by the link that includes information regarding the web page to which the link points. The informational region may include, for example, a text box that apparently floats near the link. The information in the region can include, for example, keywords in the meta tags of the web page; paragraph headings of the web page; links on the web page to other pages; etc. A link can be text, graphics, or anything else that can be selected (such as clicked on) by the user.

Embodiments of the invention thus provide for advantages. To determine what is on the web page pointed to by a link, the user does not have to actually click on or otherwise select the link to commit to downloading the new web page. The user only has to position the cursor over the link in order to cause the informational region to be displayed. The informational region provides a short synopsis of the page to which the link points, desirably with sufficient information that the user can determine whether it is worth clicking on the link. The contents of the informational region are automatically generated in one embodiment, so that the author of the current web page does not need to spend extra effort updating link descriptions. The web browsing experience, in other words, becomes less frustrating for the user, because he or she does not have to constantly select links to find a web page that is of interest. It is noted, as can be appreciated by those of ordinary skill within the art, that embodiments of the invention are usable, and provide advantages, regardless of whether the user has a fast or slow connection to a network, such as the Internet.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIGS. 7A, 7B, 8A, 8B, 9A, 9B, 10A and 10B are flowcharts of methods to automatically generate a summary to be displayed in an informational region for a web page, according to an embodiment of the invention; and, FIG. 11 is a diagram of a system according to an embodiment of the invention.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Operating Environment

Figure 1:
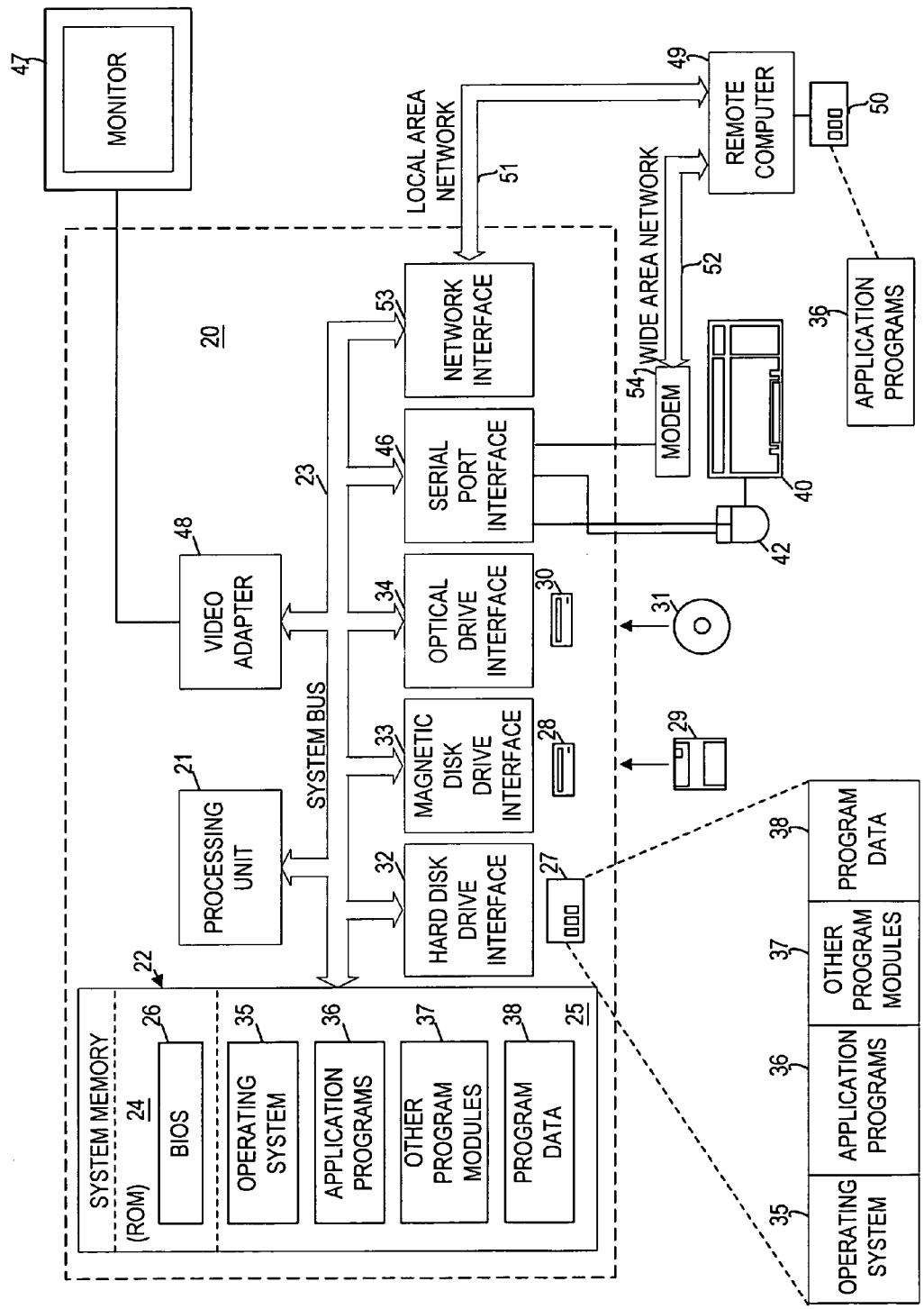
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general-purpose computing-device in the form of a computer, including a processing unit 21, a system memory 22, and a system bus 23 that operatively couples various system components including the system memory to the processing unit 21. There may be only one or there may be more than one processing unit 21, such that the processor of computer comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM). A basic input/output system (BIOS) 26, containing the basic routines that help to transfer information between elements within the computer, such as during start-up, is stored in ROM 24. The computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM, including an operating system 35, one or more application programs 36, other program modules 37, and program data 38. A user may enter commands and information into the personal computer through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer; the invention is not limited to a particular type of communications device. The remote computer 49 may be another computer, a server, a router, a network PC, a client, a peer device or other common network node, and typically includes many or all of the elements described above relative to the computer, although only a memory storage device has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It is appreciated that the network connections shown are exemplary and other means of and communications devices for establishing a communications link between the computers may be used.

Overview

Figure 2:
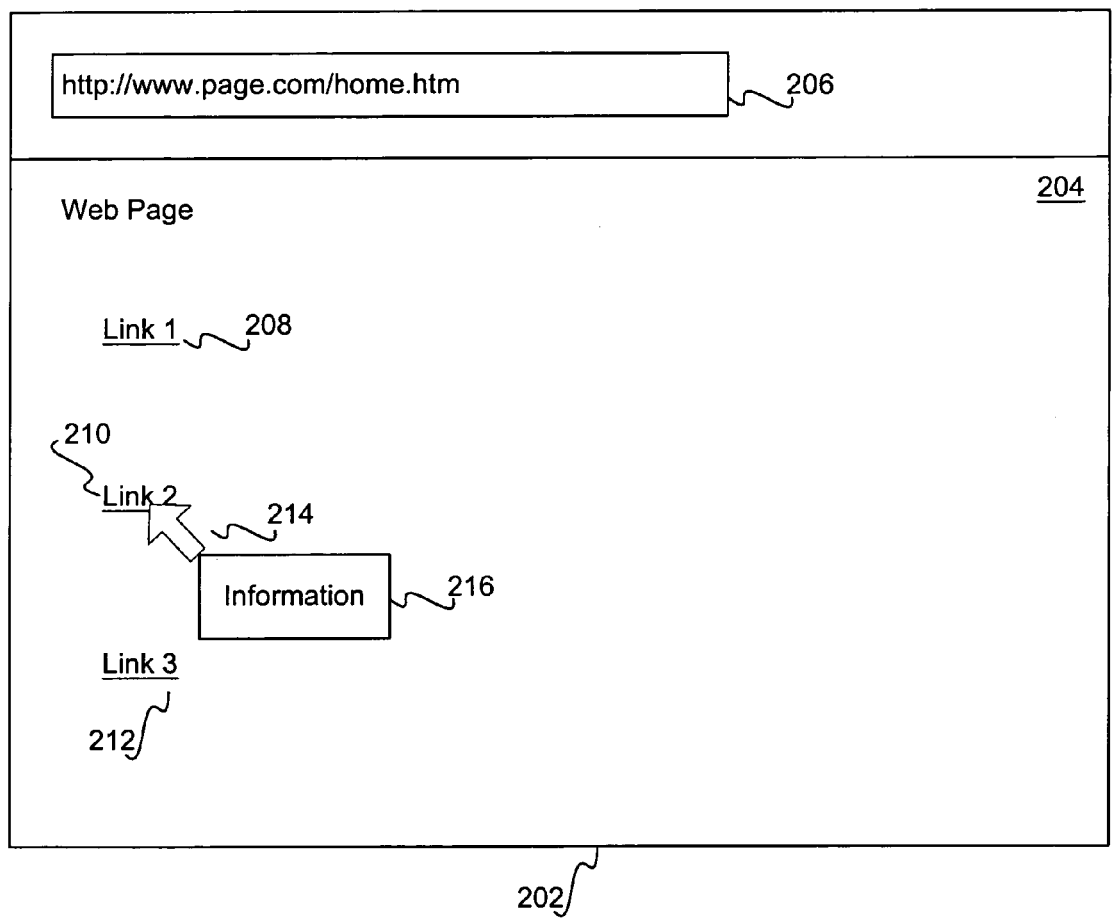
FIG. 2 is a diagram of a window of a web page in which an embodiment of the invention has been applied.

In this section of the detailed description, an overview of an embodiment of the invention is provided. Referring to FIG. 2, a diagram 200 is shown of a window 202 in which a web page 204 is being displayed. The window 202 may be a window of a web browser program, such as are known within the art. The window 202 includes an address bar 206 in which the address of the web page 204 is displayed, such as a Uniform Resource Locator (URL) address as known within the art. The web page 204 includes a number of links, or hyperlinks, to other web pages; as shown in FIG. 2, the web page 204 includes three links 208, 210, and 212. It is noted that a given link can in some embodiments have two parts—the link text, which is displayed on the web page, and the link address (such as a URL), which is the address of the web page to which the link points. Thus, selection of the link text causes the web browser to be directed to the new web page identified by the link address.

The web page may be a part of a web site on the World-Wide Web (WWW) of the Internet, a part of an intranet or an extranet, stored on a user's disk as an offline HTML file, etc.; the invention is not so limited. In particular, embodiments of the invention are applicable to any displayable file that can or does not have to be downloaded (encompassed under the term "web page") in which hyperlinks (encompassed under the term "links") are included to other displayable files, such that a user can navigate among files by selecting links and/or entering in the addresses of the files (where addresses encompass file names, or other denotations of the files). The term link can refer to text, such as underlined text, graphics, etc.; the invention is not so limited.

The diagram 200 also includes a cursor 214. The cursor 214 is defined in a non-restrictive and non-limiting manner herein as an indicator, such as a visual or audible indicator, that is used by the user to pointing to an element within the window 202. The cursor 214 is typically controlled by the user via a user-controllable device, such as a pointing device (e.g., a mouse or a touchpad), as known within in the art, although the invention is not so limited. By utilizing the pointing device, the user causes the cursor 214 to move over at least two dimensions (and, in some embodiments, three or more dimensions). Usually the pointing device will have one or more buttons, such that actuation of the button in a predetermined manner causes an element within the window 202 to be selected when the cursor 214 is positioned over the element. For example, if the user positions the cursor 214 over a web page link, and clicks the left button, then the user has committed to downloading the web page, such that the downloading of the web page to which the actuated web page link points begins—the new web page is displayed within the window 202, and, usually, the address of this new web page is shown in the address bar 206. It is noted that the use of the pointing device as has been described is for example purposes, and the invention itself is not so limited.

When the cursor 214 is moved such that it is positioned over a web page link for at least a predetermined amount of time, usually about 1–2 seconds—also referred to as hovering over a web page link—an informational region is displayed by the link. As shown in FIG. 2, for instance, the cursor 214 is hovering over the web page link 210, which causes the informational region 216 to be displayed by the web page link 210. It is noted that the cursor 214 being positioned "over" a web page link encompasses situations where not the entire cursor 214 is over the web page link, but at least some of the cursor 214 is. Similarly, it is noted that the informational region 216 being displayed "by" a web page link encompasses situations also where the region is positioned by the cursor 214 as well; furthermore, the phrase "by" also encompasses situations, for example, where the information is displayed at the bottom of a window, such as a browser window. This can include, for example, the status bar of the browser window where usually the URL of a hovered-over link is displayed, as known within the art. In an alternative embodiment, the informational region 216 can be placed in a consistent position in the window 202, and this also is encompassed under the phrase "by" as used herein. For example, the information region 216 can be placed next to the status bar 218, or in a possible fixed frame 220.

The informational region includes information regarding the web page to which the web page link points. Thus, the informational region 216 includes information regarding the web page to which the web page link 210 points. In this manner, a user is able to obtain information regarding a web page without selecting the web page link 210, and committing to begin downloading that web page. It is noted that the informational region 216 is not limited as to shape or size. For example, the region can include a rectangular box of text, which appears to be floating near the web page link.

In accordance with the embodiments of the invention, before fetching, the contents of the informational region 216 are stored separately from the contents of web page 204. In other words, the fetching of the contents of the informational region 216 is separate from the fetching of the contents of the web page 204. This allows a system to either manually or automatically generate the contents of the informational region 216 without forcing the author of the web page 204 to create up-to-date informational region contents This separate content generation provides useful information to the user on a large fraction of links, even if the web page authors did not provide content for informational regions. In addition, separate content generation allows the content of the informational regions to be updated automatically as the content of web pages change. Therefore, the user gets up-to-date summaries of web pages. Furthermore, the contents of the web page 204 are left unchanged, so that if a web browser is not enabled to fetch the contents of the informational region 216, or if the user does not wish to view the contents of the informational region 216, then the user experience of the web page 204 is left unchanged.

Types of Information Displayable within an Informational Region

Figure 3:
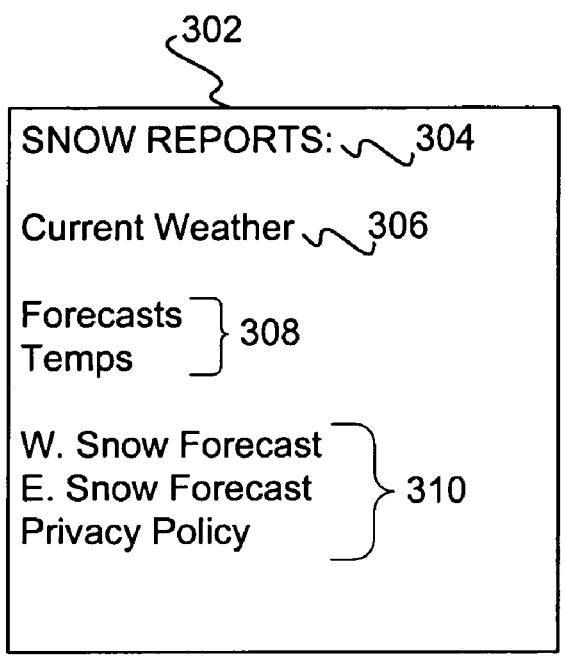
FIG. 3 is a diagram of an example informational region according to an embodiment of the invention.
Figure 3:
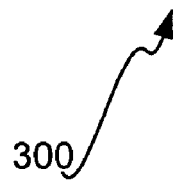

In this section of the detailed description, several example types of information that can be displayed within an informational region are described. However, the invention is not so limited to the type of information that can be displayed within an informational region. In one embodiment, a web page's title, headers, keywords, and links are displayed to create a brief summary or synopsis of the web page to which a link points. For example, in the case of the HyperText Markup Language (HTML), there are metadata within a web page, which generally include information not to be displayed when the page itself is being displayed, that include such information. Thus, the title, headers, and keywords of a page are typically encoded within the metadata of an HTML web page, as known within the art. The links are also encoded within tags; however, they are also displayed when the page itself is displayed. An example of an informational region including such information as described is shown in the diagram 300 of FIG. 3. The informational region 302 includes the following information: the title 304 of the web page; a header 306 within the web page; keywords 308 within the web page; and, links 310 to other web pages within the web page. In one embodiment, all the information except for the title 304 is preceded by bullets to make for a bullet-item list, although this is not shown in FIG. 3, and the invention is not so limited.

Other types of information that can be displayed within an informational region include information based on the user's relationship to the web page, such as the user's prior web browsing history for the web page. For example, the region may indicate when the user last visited the web page, and how many times total the user visited the web page. Another type of information that can be displayed within an informational region includes information based on the user relative to the web page, such as whether the user is likely to be interested in browsing the web page. For example, based on other web pages the user has browsed, and/or user-indicated preferences, etc., information can be displayed within the region indicating whether the user is likely to be interested in browsing the web page to which the link points. It is noted that in one embodiment, the information displayed within an informational region is limited to a predetermined amount of data, so that the data can be transmitted quickly to the user's browser. In one embodiment, the data for a given web page link contains an average of 350 bytes.

Still other types of information that can be displayed within an informational region include: whether the link is broken (that is, points to a web page that no longer exists); whether the page that the link points to is new as compared to the last time the user visited the page; when the web page to which the link points was last updated; whether the web page includes adult content; whether the web page lies on a secure server; whether the web page lies on a server that usually has a slow connection; and, how large the web page to which the link points is. Furthermore, if the web page includes content that is not be viewed by the user, such as adult-oriented content, etc., then the web page link to the web page can be disabled. The link may also be displayed in one of a number of different colors based on some predetermined criteria. For example, pages the user is likely to be interested in may be displayed in blue, etc.

Methods

In this section of the detailed description, methods according to varying embodiments of the invention, from a general embodiment to a specific embodiment, are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 4:
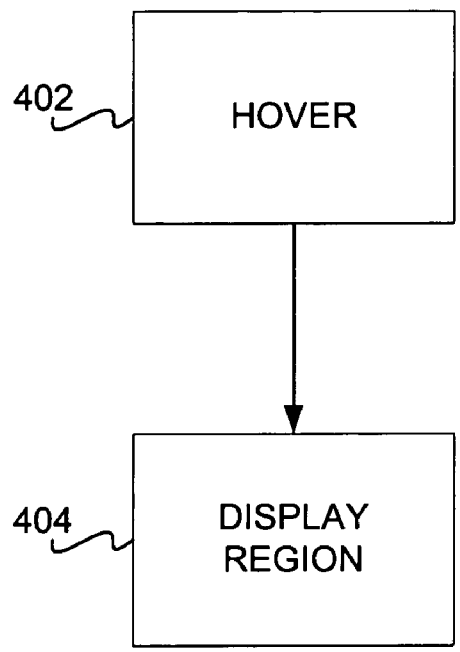
FIG. 4 is a flowchart of a method according to a general embodiment of the invention.
Figure 4:
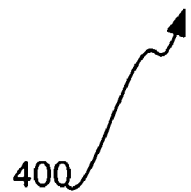

Referring to FIG. 4, a flowchart of a method 400 according to a general embodiment of the invention is shown. In 402, a cursor hovers over a web page link of a current web page. In response to the cursor hovering over the link, in 404, an informational region is displayed by the link, the region including information regarding the web page to which the link points. Not shown in FIG. 4 is that the method 400 can also disable a web page link in response to determining that the page to which the link points includes content that the user is not allowed to view, such as adult-oriented content, and/or can display the link in one of a number of colors, based on a predetermined criteria, as have been described.

Figure 5:
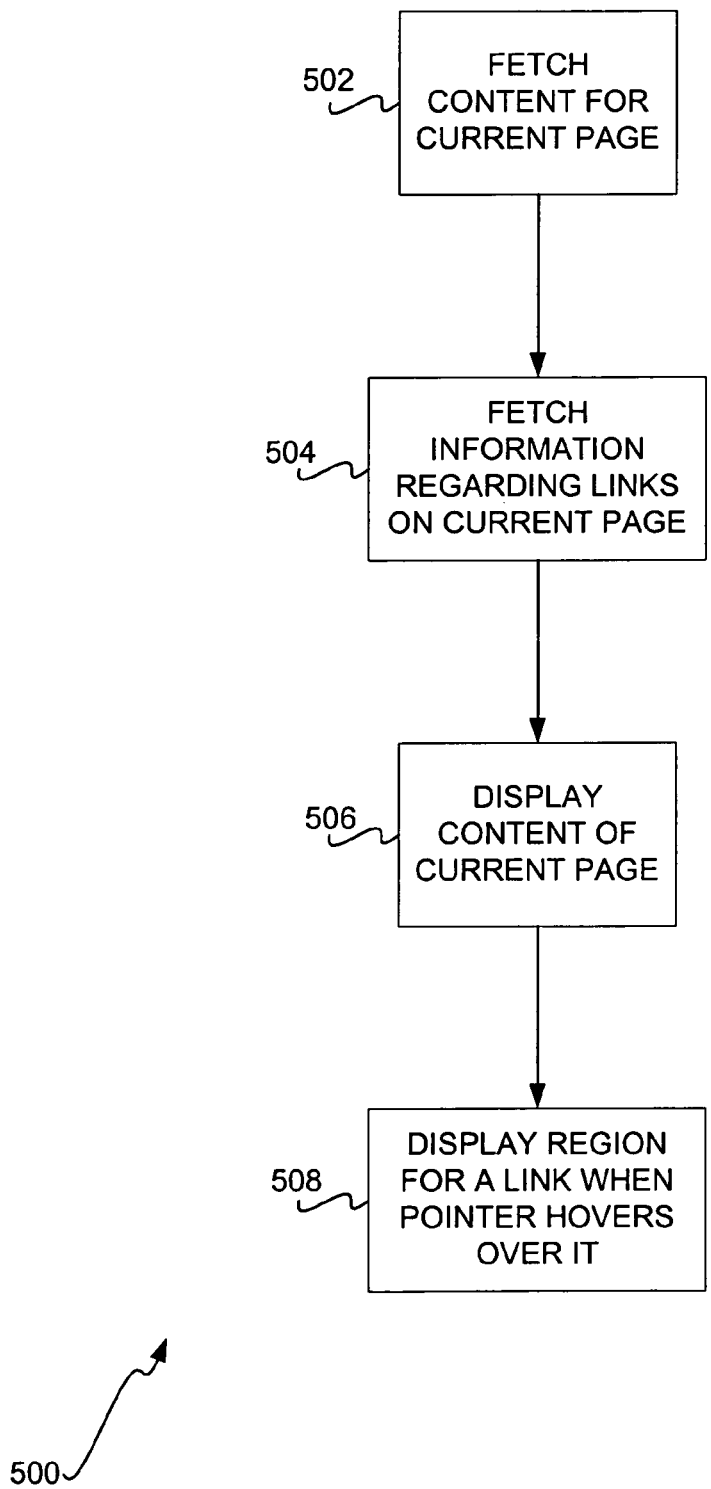
FIG. 5 is a flowchart of a method according to a more specific embodiment of the invention.

Referring to FIG. 5, a flowchart of a method 500 according to a more specific embodiment of the invention is shown. For example, the method 500 can be performed by a web browser program running on a computer such as the computer of FIG. 1 previously described. In 502, the content for a current web page is fetched, or retrieved. This can also be referred to as downloading the web page into the browser. The content of the web page refers to the information included within the web page, such as the text, graphics, multimedia, metadata, hyperlinks, and other information that may be included within the web page. In the method of FIG. 5, the web page is assumed to have one or more web page links, where each link points to another web page.

In 504, the information regarding the web pages to which the web page links point is fetched, or retrieved. This is the information that will be displayed in an informational region when the cursor substantially hovers over the links. In 506, the content for the current web page is displayed. It is noted that the order of performance of 504 and 506 is not limited by the invention. For example, 504 and 506 may be performed at the same time, 506 may be performed after 504, or 504 may be performed after 506. It may be desirable, for instance, to display the current web page's content at the same time or before the information for the informational regions is fetched, so that the user has something to view while the information for the regions is being retrieved. That is, it is noted that the parts of the method 500 can be performed serially in any order, or concurrently with one another. For example, the fetching of web page information in 504 can be performed concurrently with, before, or after the content of the current web page is fetched in 502.

Finally, in 508, when the method detects that the cursor is hovering over a particular web page link on the current web page, it displays an informational region by this particular link, where the region includes the information previously fetched regarding the web page to which the particular link points.

It is noted that embodiments of the invention as described in conjunction with the method 500 of FIG. 5 are not limited as to where the information that will be displayed in the informational regions is stored. For example, in one embodiment, the information is stored in what can be generally referred to as an entity, such that in 504, this information is retrieved from the entity. The entity may include a local cache, a proxy cache, a centralized server, or a web server that contains the web page, for instance, although the invention itself is not so limited. Thus, in 504, in one embodiment, the method 500 sends a request to the entity for the information, and if the entity has the information (that is, the entity determines that the information exists), the information is returned. Otherwise, in one embodiment, the entity generates the information, and then returns it.

Figure 6A:
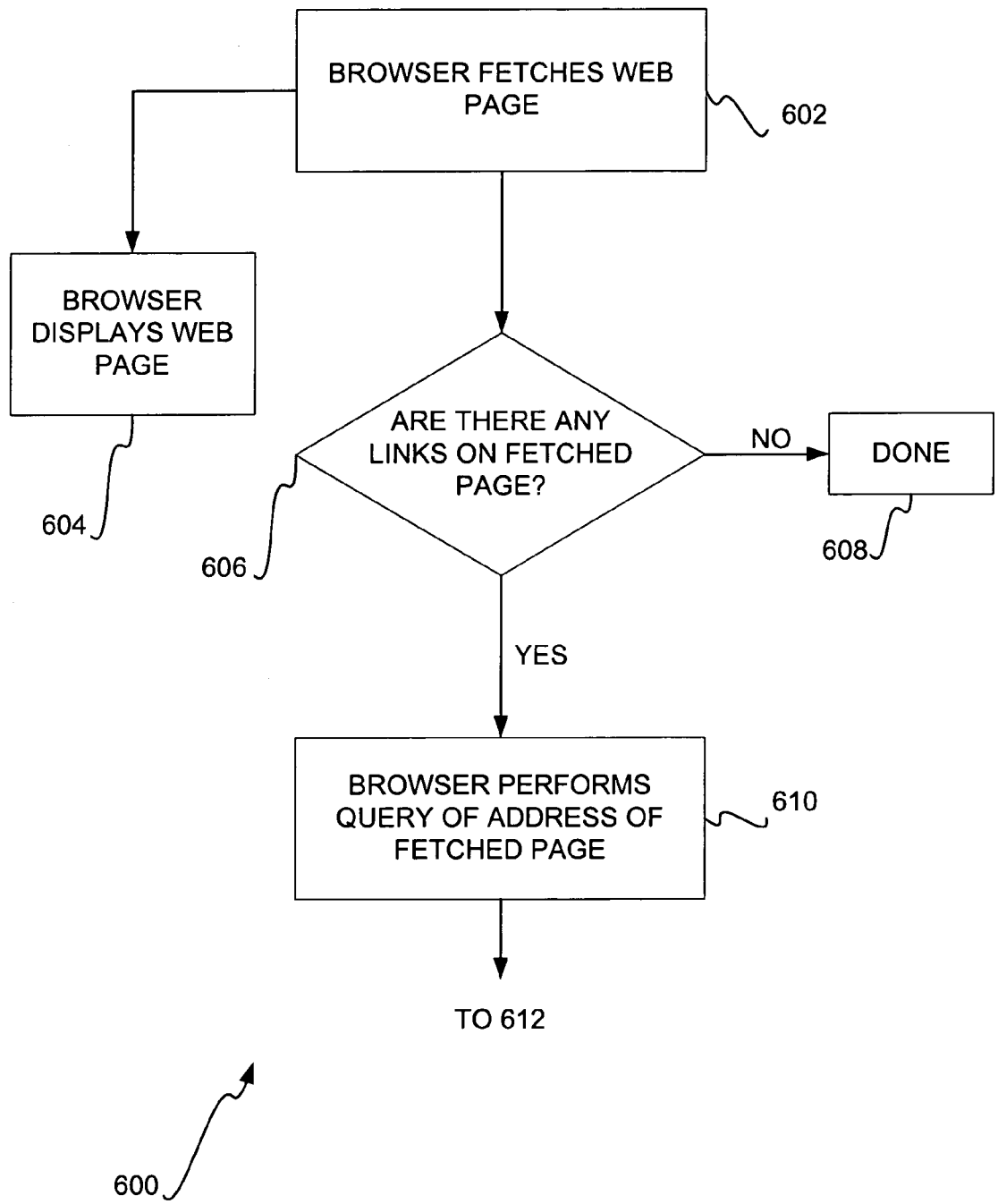
FIGS. 6A and 6B is a flowchart of another particular method according to an embodiment of the invention.
Figure 6B:
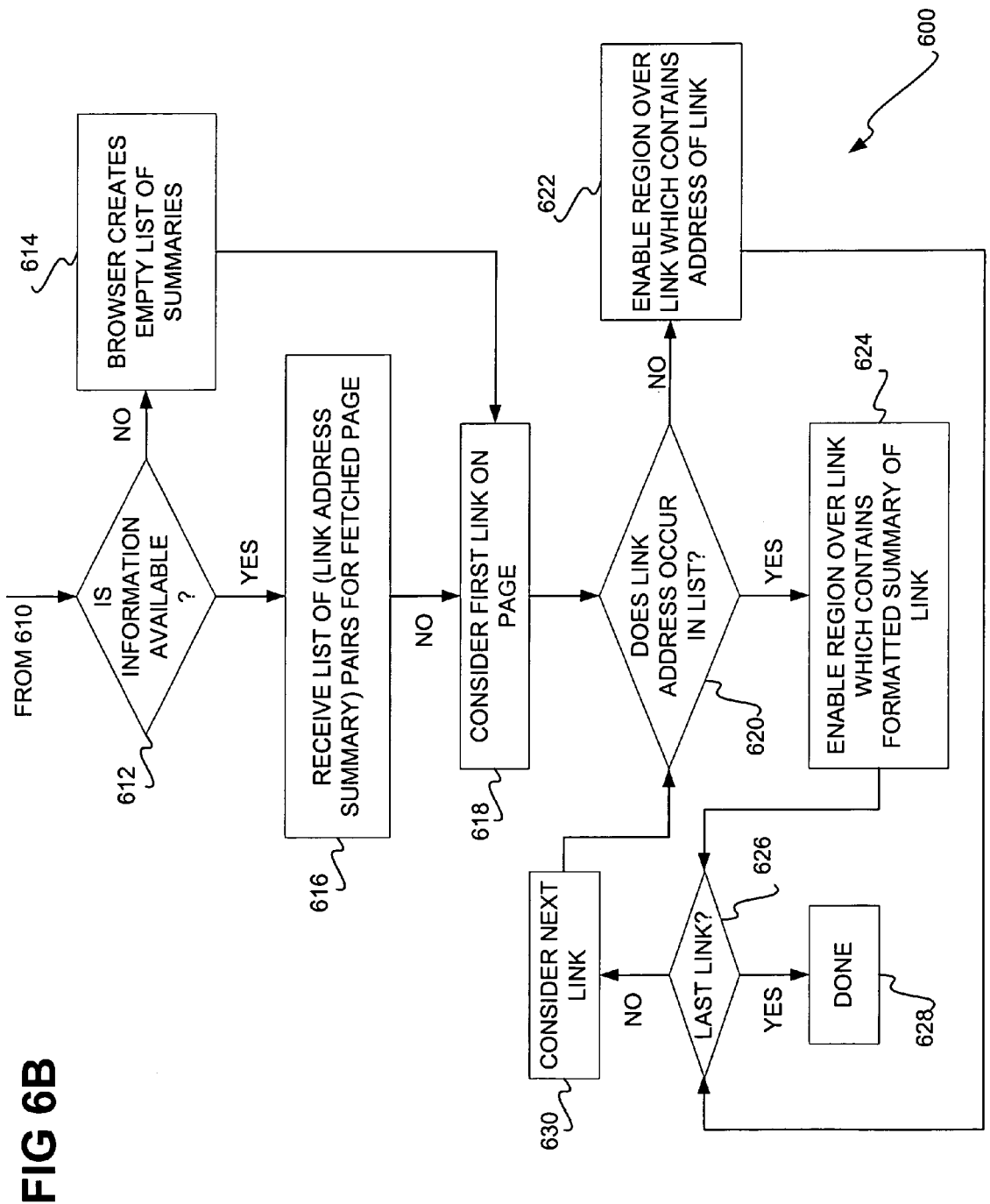

Referring next to FIGS. 6A and 6B, a flowchart of a method 600 of a particular embodiment of the invention is shown. The method 600 is divided over the two figures, FIGS. 6A and 6B. The method 600 is desirably performed by or in conjunction with a web browser program running on the computer or other such device of the user. In 602, the browser fetches the current web page to be displayed, and performs in parallel both 604, in which it displays the web page, and the path of the method 600 starting at 606. In 606, the method determines whether there are any links within the content of the current web page. If not, then the method ends at 608.

However, if there are links to other web pages on the current page, then in 610 the browser performs a query of the address of the fetched (current) web page. This query can be to a cache or a server that stores the information to be displayed in the informational regions, or other entity. If the information is not available—that is, if the address of the current web page is not stored by the entity—then in 614 the browser creates an empty list of summaries, or synopses, for the links on the current page. Otherwise, in 616, the browser receives a list of (link address, summary) pairs for the fetched page, as stored by the entity. Each entry within the list includes the address of a web page link, and a summary for the web page to which the web page link points.

From either 614 or 616, the method proceeds to 618, where the method examines the first link on the page. In 620, it determines whether this link is in the list. It is noted that the link may not be in the list if an empty list was created 614, or if the link has been added to the web page after the information was stored by the entity (i.e., when the page as stored by the entity does not contain this particular link). If the link is not in the list, then in 622, an informational region is enabled for this web link that includes only the address of the link, such as the Uniform Resource Locator (URL) address of the link. Thus, if information is not available for the link, in 622 "default" information is enabled that includes only the address of the link. In an alternative embodiment, 622 can check to see if the text summary is available in a local cache. If the summary is not available, 622 can fetch the text of the web page linked to by the URL. This text can be automatically summarized according to a method such as that described in FIGS. 7A and 7B, 8A and 8B, 9A and 9B, and 10A and 10B. This summary is then stored in the local cache. Turning attention back to 620, if the link is in the list, then in 624, the informational region is enabled for this web link that includes the summary for the link within the list of (link, summary) pairs.

From either 622 or 624, the method proceeds to 626, to determine whether the link just examined was the last link on the current page. If so, the method proceeds to 628, where it is finished. Otherwise, the method proceeds to 630, where the next link on the page is considered, and the method returns to 620, to process this link. This process continues until an informational region has been enabled for all the links of the page, including either the summary retrieved from the list, or the address of the link where no summary is present.

Next, another method according to an embodiment of the invention is described that is the manner by which a summary for a web page can be automatically generated. It is noted that the invention is not limited to this manner, and other manners for automatic generation of the summary of a web page that will be displayed as the information for the informational region of a link are also within the scope of the invention. In particular, the method to be described looks for keywords, paragraph headings, and other web page links within a given web page. The method attempts to fill nine slots worth of such information, desirably three keywords, three paragraph headings, and three web page links. If there is less than three of any of these types of information, however, but still at least nine total items of information, then more than three of a given type of information are used to fill the slots. If there is less than nine total items of information, then all the information is included. It is noted that the nine slots is with respect to a specific embodiment of the invention—in general, any predetermined number of slots can be filled and still be within the invention, as can be appreciated by those of ordinary skill within the art.

The method to be described is desirably performed by an entity that is maintaining a database of information to be displayed within the informational regions, such as a server, for example. The method is described in conjunction with the methods of FIGS. 7A, 7B, 8A, 8B, 9A, 9B, 10A and 10B, each of which perform a particular part to achieve the functionality described in this paragraph. Each pair of FIGS. 7A and 7B, 8A and 8B, 9A and 9B, and 10A and 10B refer to a method, which is divided over the two respective figures.

Figure 7B:
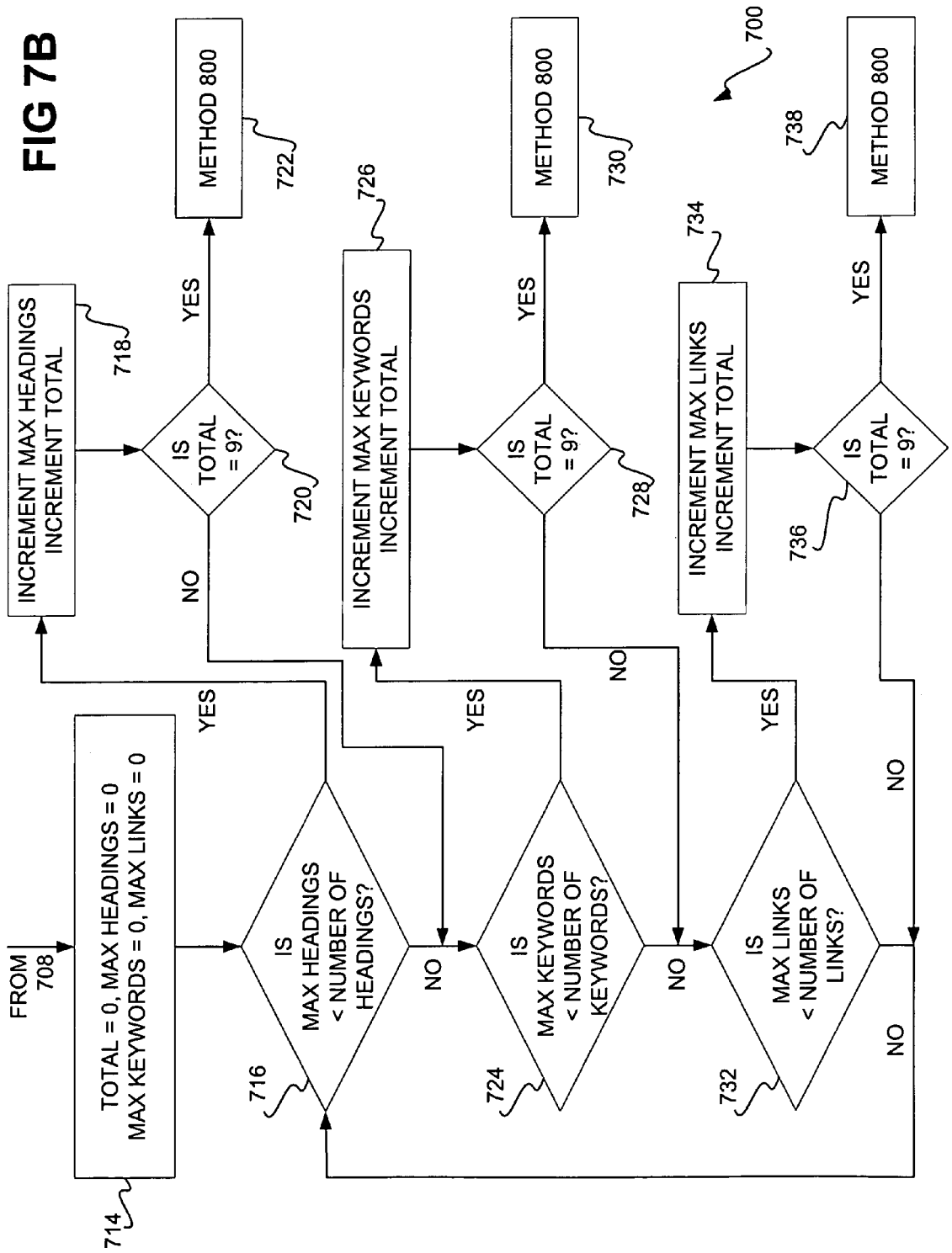

Referring first to FIGS. 7A and 7B, a flowchart of a method 700 is shown. The method 700 is divided over the two figures, FIGS. 7A and 7B. In 702, the content for the web page to be processed is retrieved, and, in 704, the title, keywords, headings, and link text and addresses are extracted from the content. It is noted that for a particular link, there is link text associated with the address of a given link, where the link text is what is underlined by the browser, such that if the link text is selected, the browser is directed to the web page pointed to by the link address. For example, the link text may be "Home Page of Microsoft," while the link address may be "http://www.microsoft.com". In 706, the total number of keywords, headings, and links are counted, and the method proceeds to 708.

Figure 8B:
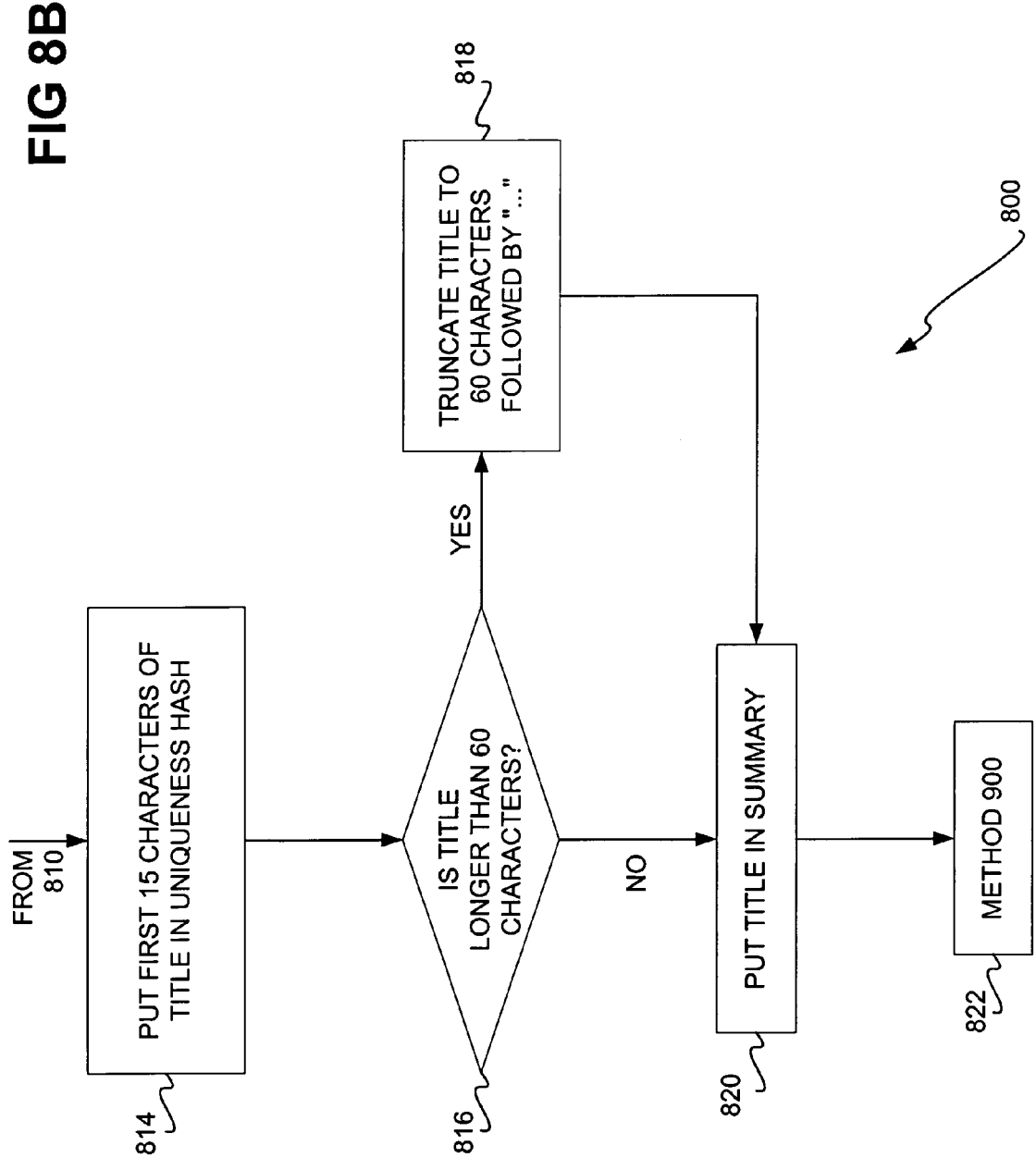

If the total number counted in 706 is less than nine (where nine is one particular embodiment of the invention, such that the invention itself is applicable to any predetermined number), then the method proceeds from 708 to 710, where the variables MaxHeadings, MaxKeywords, and MaxLinks, are set to the actual number of headings, keywords, and links, respectively, extracted in 704. The method then proceeds from 710 to 712, where the method 800 of FIGS. 8A and 8B is performed, as described later in this section of the detailed description.

If the total number counted in 706 is not less than nine (where nine is one particular embodiment of the invention, such that the invention itself is applicable to any predetermined number), then the method instead proceeds from 708 to 714, where the variables Total, MaxHeadings, MaxKeywords, and MaxLinks are initialized to zero. Next, in 716, it is determined if the maximum number of headings as tracked by the variable MaxHeadings is less than the total number of headings as counted in 706. If so, then the method proceeds to 718, where the variable MaxHeadings is incremented by one, and the variable Total is also incremented by one. In 720, if the total is now equal to nine, the method proceeds to 722, where the method 800 of FIGS. 8A and 8B is performed. Otherwise, the method proceeds to 724, to which the method also proceeds from 716 if the MaxHeadings variable is not less than the number of headings.

In 724, it is determined whether the MaxKeywords variable is less than the number of keywords counted in 706. If so, then the method proceeds to 726, where the variable MaxKeywords and the variable Total are both incremented by one. In 728, if the total is now equal to nine, the method proceeds to 730, where the method 800 of FIGS. 8A and 8B is performed. Otherwise, the method proceeds to 732, to which the method also proceeds from 724 if the MaxKeywords variable is not less than the number of keywords.

In 732, it is determined whether the MaxLinks variable is less than the number of links counted in 706 (each link text and link address pair counts as one link). If so, then the method proceeds to 734, where the variables MaxLinks and Total are both incremented by one. In 736, if the total is now equal to nine, then the method proceeds to 738, where the method of 800 of FIGS. 8A and 8B is performed. Otherwise, the method proceeds back to 716, back to which the method also proceeds from 732 if the MaxLinks variable is not less than the number of links.

Thus, the process followed by the method 700 of FIGS. 7A and 7B within 714 through 738 is to add one to MaxHeadings, one to MaxKeywords, and one to MaxLinks in an iterative process, until a total of nine of the MaxHeadings plus the MaxKeywords plus the MaxLinks has been reached (where nine is one particular embodiment of the invention, such that the invention itself is applicable to any predetermined number). If any of the actual number of keywords, headings, and links has been exhausted, it is skipped. The variables MaxHeadings, MaxKeywords, and MaxLinks are then used to determine the number of headings, keywords, and links, respectively, to use from the web page being examined in the informational region summary for the link to this web page.

Referring next to FIGS. 8A and 8B, a flowchart of a method 800 according to an embodiment of the invention is shown. The method 800 is divided over the two figures, FIGS. 8A and 8B. The method 800 of FIGS. 8A and 8B is specifically performed within the method 700 of FIGS. 7A and 7B, as has been described. The method 800 specifically filters the web page links on the web page being considered (i.e., the same web page as that of the method 700), to ensure that there are no redundant links within the summary for the page (specifically, there is no redundant link text), and to add the title of the web page to the summary (viz., the information to be displayed within an information region).

In 802 of the method 800, the link address of the first link is examined. In 804, if this link address has a summary associated with it in the database of summaries maintained by the entity, then the method proceeds to 806, where the link address is added to a list of link addresses for the web page being examined in the database. It is noted that this list of link addresses, along with the summaries corresponding to the link addresses, is what is returned by the entity in one embodiment when a browser program, for example, requests the list of (link address, summary) pairs from the entity, as has been described. The method then proceeds from 806 to 808, to which the method also proceeds if the link address did not have a summary in the database in 804.

In 808, the link text portion of the summary for web page corresponding to the link being considered is inserted into a link exclusion hash. The link exclusion hash is used, as will be described, to ensure that redundant link texts are not inserted in the summary for the web page. For example, if there are numerous link texts for links on the web page of "Home Page" it is not useful information for the user to view three link texts of "Home Page" in the informational region, especially in the case where there are link texts on the page other than "Home Page". The link exclusion hash can also be initialized to contain common uninformative link texts, such as "click here", "next", or "previous". The method next proceeds to 810, where it is determined if the last link has been considered. If not, then in 812 the method considers the link address of the next link, and returns to 804 to examine this link, as has been described.

Once the last link has been considered, the method proceeds from 810 to 814. In 814, the first 15 characters of the title of the web page being considered are inserted into a uniqueness hash. The uniqueness hash is used, as will be described, to ensure that redundant textual information is not inserted in the summary for the web page. Next, in 816, it is determined if the title is longer than 60 characters. If so, then in 818, the title is truncated to the first 60 characters, followed by an ellipsis (" . . . "). Then, the method proceeds to 820, to which the method also proceeds from 816 if the title is not longer than 60 characters. In 820, the title is inserted into the summary or synopsis for the web page that is to be displayed within the informational region by a web page link pointing to the web page on another web page. Finally, in 822, the method proceeds to the method 900 of FIGS. 9A and 9B, as is described next.

Figure 9A:
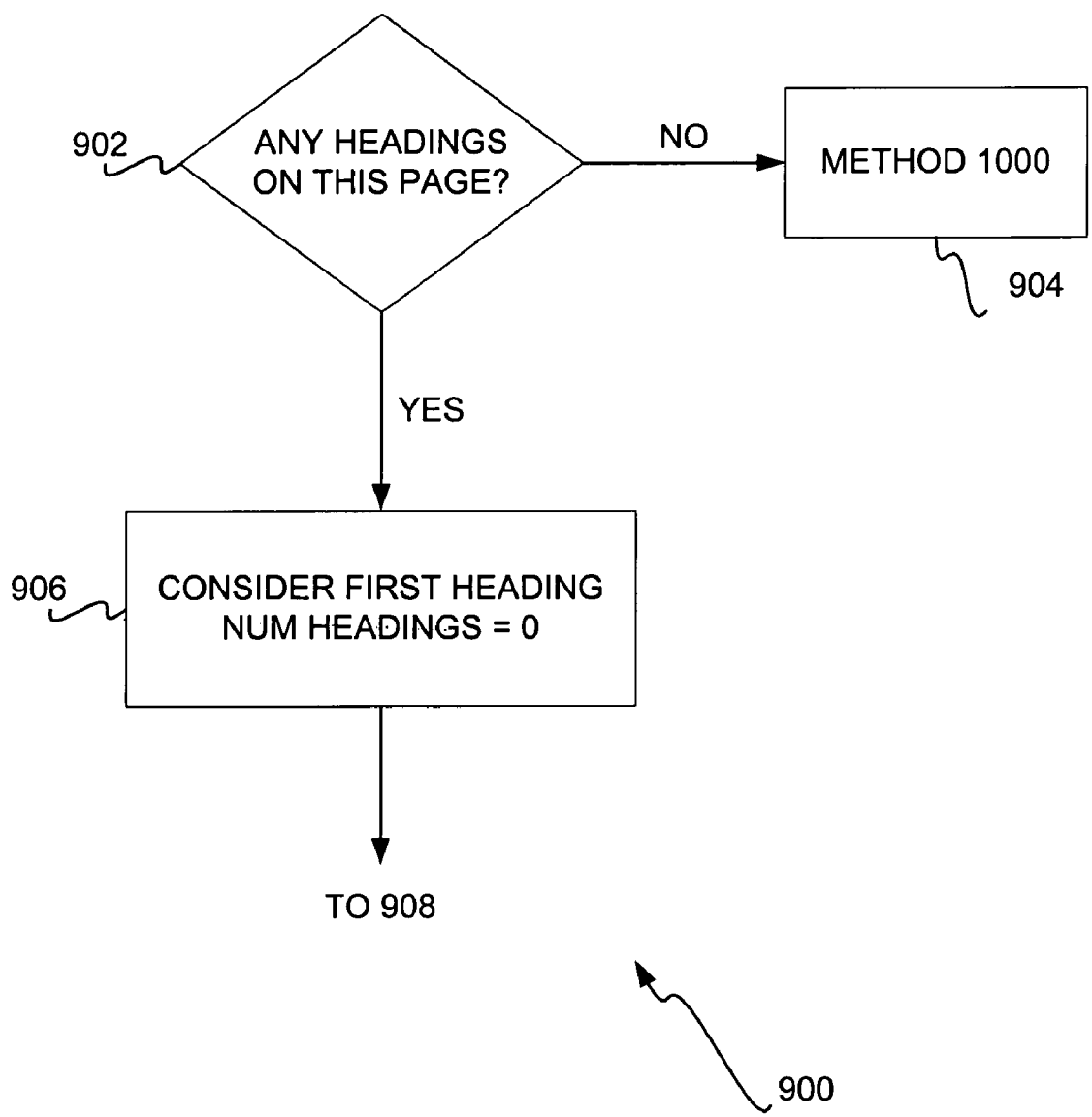
Figure 9B:
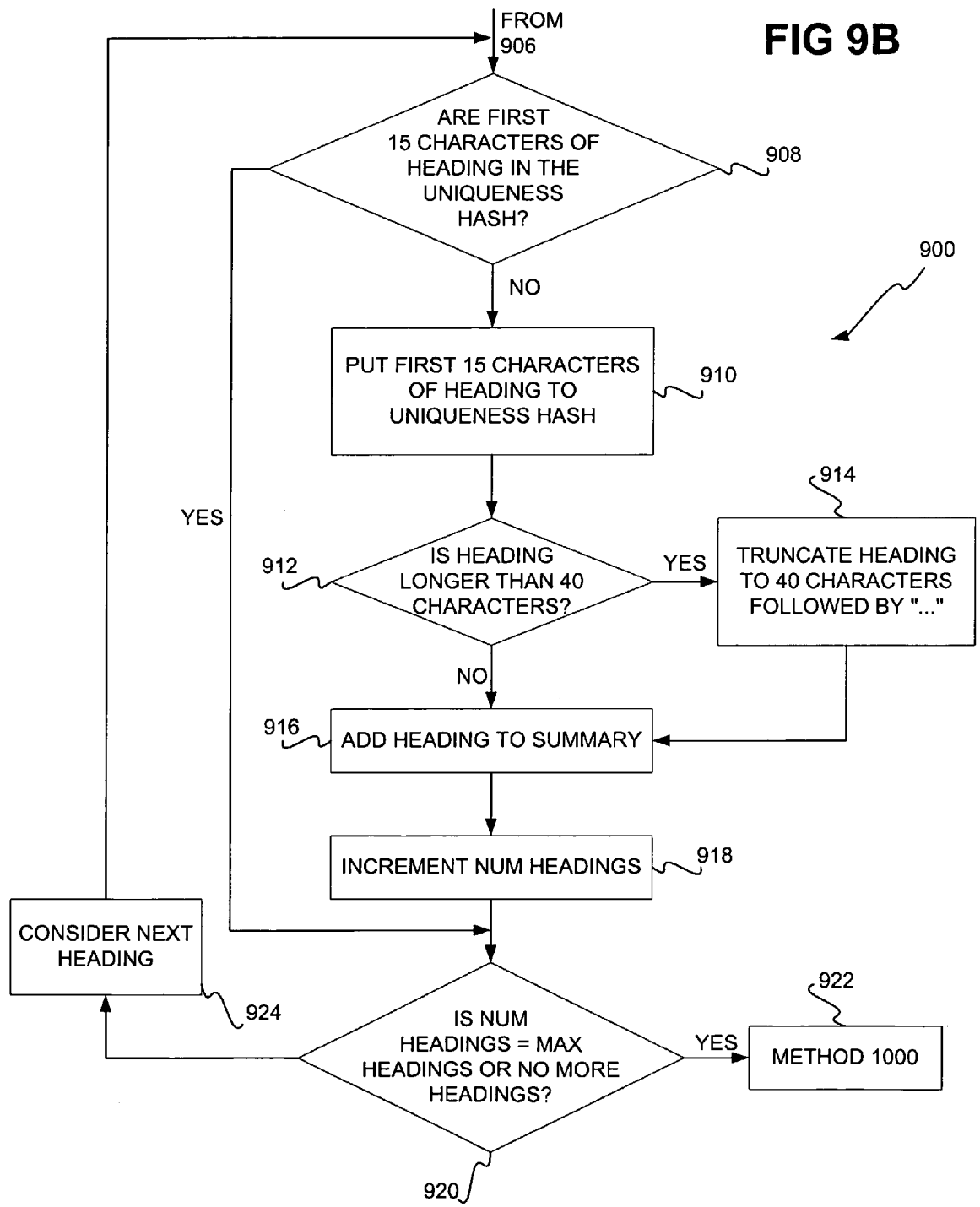

In FIGS. 9A and 9B, a flowchart of the method 900 is shown. The method 900 is divided over the two figures, FIGS. 9A and 9B. The method 900 is performed to add the headings, or headers, of the web page into the summary for the web page. It is noted that thus far, after performance of the methods 700 of FIGS. 7A and 7B and 800 of FIGS. 8A and 8B, the only information that has been inserted into the summary has been the title of the web page. In 902, it is determined whether there are any headings on the current web page. If not, the method proceeds to 904, where the method 1000 of FIGS. 10A and 10B is next performed.

Otherwise, the method proceeds to 906, where the variable numHeadings is initialized to zero, and the first heading is considered. In 908, if the first 15 characters of the heading are not in the uniqueness hash, then the method proceeds to 910, where the first 15 characters of the heading are inserted in the uniqueness hash. Next, in 912, if the heading is longer than 40 characters, the method proceeds to 914, to truncate the heading to 40 characters followed by an ellipsis. If the heading is not longer than 40 characters, the method proceeds from 912 to 916, to which the method also proceeds from 914. In 916, the heading is added to the summary, and in 918, the variable numHeadings is incremented by one.

The method next proceeds to 920, to which the method also proceeds from 908 if the first 15 characters of the heading were found in the uniqueness hash in 908. In 920, it is determined whether the variable numHeadings is equal to the variable MaxHeadings, or if there are no more headings. If either of these is the case, then the method proceeds to 922, where the method 1000 of FIGS. 10A and 10B is performed. Otherwise, the method proceeds to 924, where the next heading is considered, and the method returns to 908 to examine this next heading, as has been described.

Figure 10A:
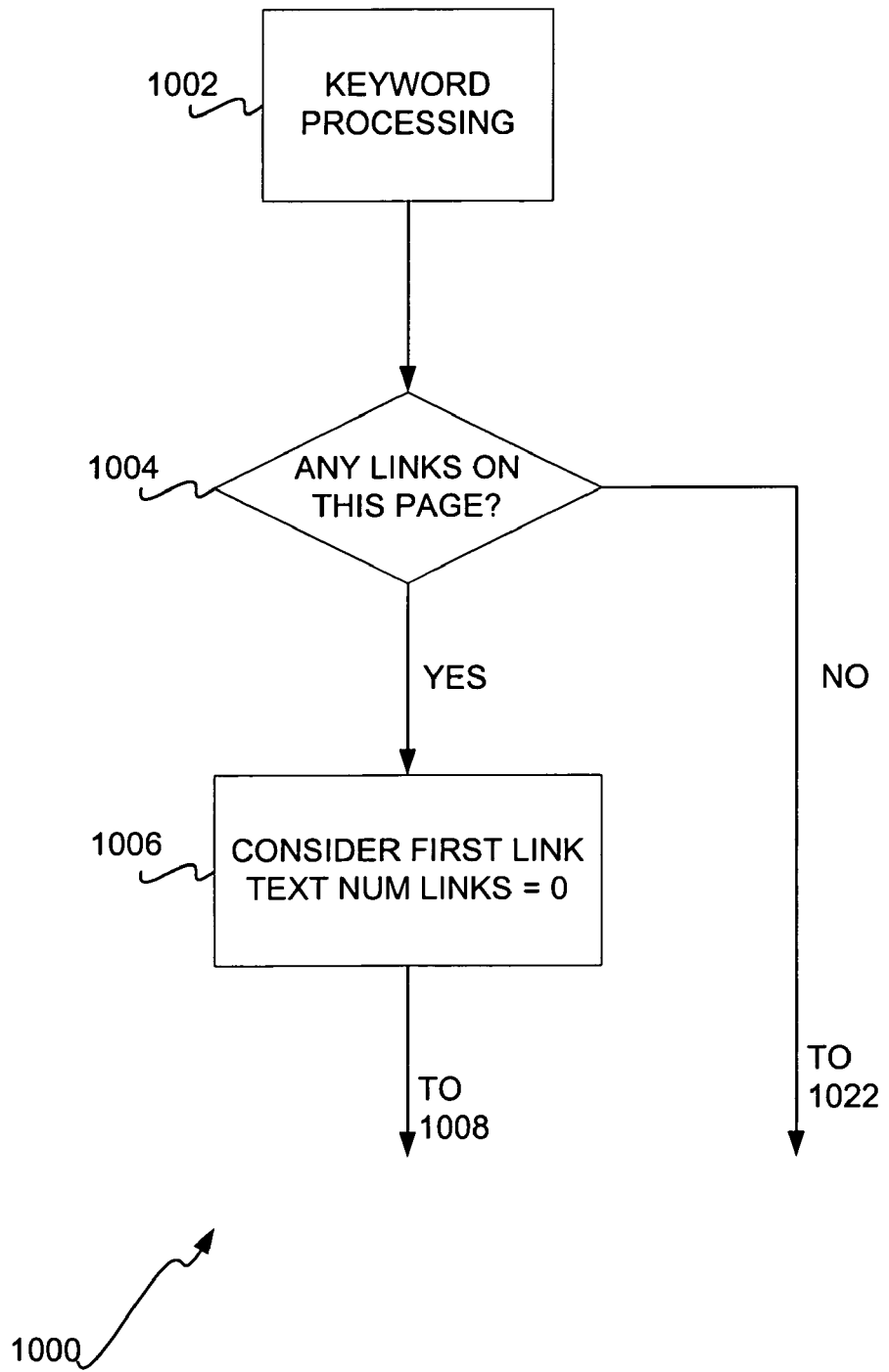

Referring next to FIGS. 10A and 10B, a flowchart of the method 1000 according to an embodiment of the invention is shown. The method 1000 is divided over the two figures, FIGS. 10A and 10B. The method 1000 adds keywords to the summary for the current web page, as well as link text of the links to the summary for the current web page. First, in 1002, keyword processing is performed. The keyword processing adds keywords to the summary for the current web page. In one embodiment, the keywords are added to the summary by performance of a method identical to the method 900 of FIGS. 9A and 9B used to add headings to the summary, except keywords are substituted for headings, as can be appreciated by those of ordinary skill within the art.

In 1004, it is determined whether there are any links on the current web page for which a summary is being generated. If so, then the method proceeds to 1006, where the link text of the first link is considered, and a variable numLinks is initialized to zero. In 1008, it is determined whether the first 15 characters of the link text are in the uniqueness hash, or if the link text is in the link exclusion hash. If neither of these is the case, the method proceeds to 1010, where the first 15 characters of the link text are inserted into the uniqueness hash, and then to 1012, where it is determined whether the link text is longer than 40 characters. If so, the method proceeds to 1014, where the link text is truncated to 40 characters plus an ellipsis. The method proceeds to 1016 from 1014, or from 1012 in the case where the text was not longer than 40 characters. In 1016, the link text is added to the summary of the web page, and the variable numLinks is incremented by one.

The method then proceeds to 1018 from 1016, or from 1008 in the case where the first 15 characters of the link text were found in the uniqueness has or the link text was found in the link exclusion hash. In 1018, it is determined whether the variable numLinks equals the variable MaxLinks, or whether there are no more links. If neither is the case, then the method proceeds to 1020, where the text link of the next link is considered, and from which the method returns to 1008 to examine the text link of this next link, as has been described. Once the variable numLinks equals the variable MaxLinks, or there are no more links, the method proceeds from 1018 to 1022, to which the method also proceeds from 1004 if it was determined in 1004 that there are no links for the current web page. In 1022, the summary for the web page is complete, and is stored in the database, and the method ends at 1024.

Systems

Figure 11:
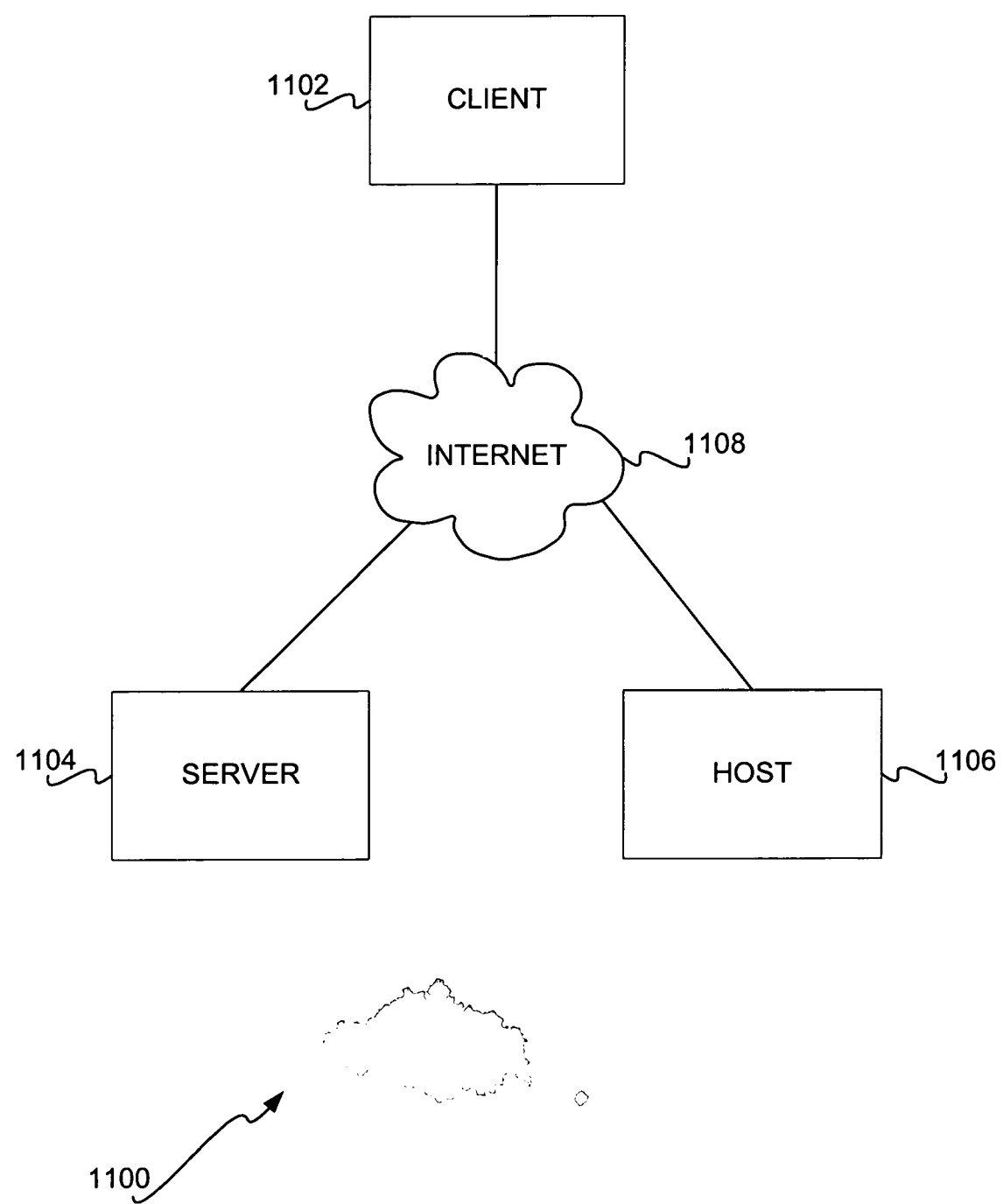

In this section of the detailed description, systems according to varying embodiments of the invention are presented. Referring to FIG. 11, a diagram of a system 1100 according to an embodiment of the invention is shown. The system 1100 includes a client 1102, a server 1104, and a host 1106, where the client 1102 communicates with the server 1104 and the host 1106 over the Internet 1108. Each of 1102, 1104, and 1106 can be referred to generally as an entity. The host 1106 is a server that hosts a web site on which web pages are stored, which can be retrieved and viewed by the client 1102, which has a web browser program for this purpose. The server 1104 stores information regarding web pages, such as the web pages of the web site hosted by the host 1106, where the information is to be retrieved by the client 1102 for displaying within informational regions as has been described. It is noted that there can be more than one client, but only one client is shown for purposes of illustrative clarity only. Also note that server 1104 can be run on the same computer as host 1106.

In distributed environments, such as the Internet, host 1106 and server 1104 can often each be implemented as one or more computers, as is known in the art. These computers are sometimes owned and maintained by different people or businesses.

When the client 1102 desires to view a web page stored on the host 1106, it requests and retrieves the web page from the host 1106 over the Internet 1108. It then displays the web page. Concurrently, the client 1102 requests and retrieves from the server 1104 information for all the links on the web page that it had requested from the host 1106. Thus, when a user of the client 1102 positions a cursor over a web page link of the web page, information regarding this link as retrieved from the server 1104 is displayed within an informational region by the web page link.

The server 1104 is generally referred to as an entity that stores information regarding the links of web pages. However, the invention is not limited to this particular type of entity. Other types of entities include local caches and proxy caches, as known within the art. In such embodiments using local caches and proxy caches, the entity would be located on the client-side of the Internet 1108, such that the client 1102 could retrieve the information stored on the entity without traversing the Internet 1108 itself. Other systems according to other embodiments of the invention include storage and generation of the information for display in informational regions at the client 1102 itself; a proxy server storing and/or generating the information for display in informational regions; and, a subscription service in which a client 1102 requests the information for display in an information region. The invention itself is not so limited, however.

If the server 1104 is separate from any host 1106, it can provide a general service of web page summarization to client 1102. These summaries would be delivered to client 1102 and would be displayed, e.g., as shown in FIG. 2. The server 1104 can contain automatically generated summaries of web pages. In addition, it can contain summaries written by people, in order to further enhance the service. These non-automatic summaries would typically be written by an editorial staff, not the owners of the hosts 1106.

In one embodiment, the automatic summarization algorithm described in FIGS. 7A and 7B, 8A and 8B, 9A and 9B, and 10A and 10B are executed on server 1104, which fetches pages from one or most hosts 1106. In another embodiment, each host 1106 may perform summarization. The server 1104 would then store the database of link/summary pairs (as described in 616 of FIGS. 6A and 6B). In this embodiment, host 1106 would only update its summaries if a corresponding web page changed. The server 1104 would periodically query hosts 1106 to see if the summaries have changed. If so, only the summaries are transmitted from hosts 1106 to server 1104. This embodiment trades off bandwidth between server 1104 and hosts 1106 for increased computation in hosts 1106. This embodiment is practical if there exists a de facto standard for communicating summaries from hosts 1106 and servers 1104. Further, if the second embodiment is used, then the alternative fetching in 622 of FIGS. 6A and 6B becomes easier, due to decreased bandwidth between the entity 1104, which would be a local cache, and the hosts 1106.

CONCLUSION

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A client-side computer-implemented method comprising:
    fetching a current web page, the current web page including one or more links, each link pointing to a web page;
    fetching current information from each linked web page, the information regarding the web page to which each link points, wherein the fetching comprises accessing each linked web page and retrieving information from each linked web page such that current information is then stored separately from the current web page once fetched;
    assembling relational information based on the fetched information from each linked web page and based on previously stored historical information, the relational information including at least one newly generated historical relationship between the current fetched information and the previously stored information regarding a user of the client-side computer;

displaying the current web page; and, displaying an informational region in response to a cursor hovering over a particular link of the one or more links, the region including the current information previously fetched regarding the web page to which the link points and the relational information previously assembled.

2. The method of claim 1, wherein displaying the informational region comprises displaying the informational region by the link.

3. The method of claim 1, wherein the method is such that a user is able to retrieve the information regarding the web page without selecting the link and committing to downloading the web page.

4. The method of claim 1, wherein the informational region comprises a text box apparently floating near the link.

5. The method of claim 1, wherein the information regarding the web page includes at least one of: keywords of the web page; paragraph headings of the web page; links on the web page to other web pages.

6. The method of claim 1, wherein the relational information includes at least information based on a user's relationship to the web page.

7. The method of claim 6, wherein the relational information based on the user's relationship to the web page includes the user's prior web browsing history for the web page.

8. The method of claim 1, wherein the relational information includes at least information based on a user relative to the web page.

9. The method of claim 8, wherein the relational information based on the user relative to the web page includes whether the user is likely to be interested in browsing the web page.

10. The method of claim 1, wherein the information regarding the web page includes at least information regarding whether the link is broken.

11. The method of claim 1, further comprising disabling the link in response to determining that the web page includes content that a user is not allowed to view.

12. The method of claim 1, further comprising displaying the link in one of a number of colors based on a predetermined criteria.

13. A machine-readable medium having instructions stored thereon for execution by a client processor to perform a method comprising:

fetching a current web page, the current web page including one or more links, each link pointing to a web page;

fetching current information from each linked web page, the information regarding the web page to which each link points, wherein the fetching comprises accessing each linked web page and retrieving information from each linked web page such that current information is then stored separately from the current web page once fetched;

assembling relational information based on the current fetched information from each linked web page and based on previously stored historical information, the relational information including at least one newly generated historical relationship between the contemporaneously fetched information and the previously stored information regarding a user of the client-side computer;

displaying the current web page; and displaying an informational region, in response to a cursor hovering over a particular link of the one or more links, the region including the current information previously fetched regarding the web page to which the link points and the relational information previously assembled.

14. The medium of claim 13, wherein displaying the informational region comprises displaying the informational region by the particular link.

15. The medium of claim 13, wherein fetching the information regarding the web page to which each link points comprises retrieving the information from a server on which the information is stored.

16. The medium of claim 13, wherein fetching the information regarding the web page to which each link points comprises retrieving the information from a local cache in which the information is stored.

17. The medium of claim 13, wherein fetching the information regarding the web page to which each link points comprises retrieving the information from a proxy cache in which the information is stored.

18. The medium of claim 13, wherein fetching the information regarding the web page to which each link points comprises:

sending a request to an entity for the information; and returning the information by the entity in response to the entity determining that the information exists.

19. The medium of claim 18, wherein fetching the information regarding the web page to which each link points further comprises, otherwise, generating by the entity of the information for the web page; and, returning the information by the entity.

20. The medium of claim 18, wherein the entity comprises at least one of: a proxy cache, a local cache; and a server.

21. The medium of claim 13, wherein the information for the web page to which each link points comprises at least one of: automatically generated content and manually generated content.

22. A computerized system comprising:

at least one first entity storing web pages;

at least one second entity separate from the first entity storing information regarding the web pages; and at least one client, each client able to browse web pages such that fetching of a web page having one or more linked web pages from at least one first entity causes the fetching of current information from each of the one or more linked web pages about the one ore more linked web pages from at least one second entity and causes the assembling of relational information based on the current fetched information and based on previously stored historical information, the relational information including at least one newly generated historical relationship between the current fetched information and the previously stored information regarding a user of the client-side computer, the and the client further operable such that positioning of a cursor over a link of a current web page causes display of an informational region including information regarding a web page to which the link points as stored on the at least one second entity and causes display of the assembled relational information.

23. The system of claim 22, wherein the informational region is displayed by the link.

24. The system of claim 22, wherein the second entity comprises at least one of: a proxy cache; a local cache; and a server.

25. A computerized system comprising:

at least one first entity capable of storing web pages;

at least one second entity capable of providing summaries of the web pages, wherein the summaries include at least one historical relationship between a user of the first entity and a web page stored on the first entity;

at least one third entity capable of providing for a given web page stored by the first entity, a list of all links on the web page and for each of the links, the corresponding summary, provided by the second entity; and at least one client, each able to browse web pages such that fetching of a web page from the at least one first entity causes fetching current information provided by the third entity and such that positioning of a cursor over a link of a current web page causes display of an informational region including at least one newly generated historical relationship that is based on previously stored historical information and the current fetched information regarding a web page to which the link points.

* * * * *